United States Patent [19]
Coffin

[11] Patent Number: 5,883,712
[45] Date of Patent: Mar. 16, 1999

[54] INTERFEROMETER OF AN INFRARED SPECTROMETER WITH DYNAMIC MOVING MIRROR ALIGNMENT

[75] Inventor: John M. Coffin, Blue Mounds, Wis.

[73] Assignee: Nicolet Instrument Corporation, Madison, Wis.

[21] Appl. No.: 859,971

[22] Filed: May 21, 1997

[51] Int. Cl.$^6$ .................................................. G01B 9/02
[52] U.S. Cl. .......................................... 356/346; 356/363
[58] Field of Search .................................... 356/345, 346, 356/363; 310/12, 14; 359/871

[56] References Cited

U.S. PATENT DOCUMENTS

| | | | |
|---|---|---|---|
| 3,936,193 | 2/1976 | Auth | 356/346 |
| 4,053,231 | 10/1977 | Fletcher et al. . | |
| 4,100,576 | 7/1978 | Ditthardt . | |
| 4,175,832 | 11/1979 | Umeki et al. . | |
| 4,203,654 | 5/1980 | Ellis . | |
| 4,376,572 | 3/1983 | Gijzen . | |
| 4,480,914 | 11/1984 | Thompson et al. . | |
| 4,613,203 | 9/1986 | Proetel et al. . | |
| 4,660,941 | 4/1987 | Hattori et al. . | |
| 4,664,487 | 5/1987 | Tam . | |
| 4,738,500 | 4/1988 | Grupp et al. . | |
| 4,799,001 | 1/1989 | Burch . | |
| 4,847,878 | 7/1989 | Badeau . | |
| 5,107,366 | 4/1992 | Huang et al. | 356/346 |
| 5,239,361 | 8/1993 | Burch . | |
| 5,276,545 | 1/1994 | Daun et al. . | |
| 5,287,031 | 2/1994 | Akiba et al. | 310/12 |

FOREIGN PATENT DOCUMENTS

WO 93/14373 7/1993 WIPO ..................................... 356/346

Primary Examiner—Samuel A. Turner
Attorney, Agent, or Firm—Foley & Lardner

[57] ABSTRACT

An interferometer that may be used in an infrared spectrometer has a housing with a fixed mirror, a perpendicular moving mirror, and a beamsplitter diagonally between them. A moving bearing is mounted to a stationary bearing for translation back and forth along a longitudinal axis, and the moving mirror is mounted to a support member which itself is mounted to the moving bearing to allow pivoting of the mirror support member about a pivot point. A permanent magnet is mounted to the support member and extends along the longitudinal axis, with one of the poles of the magnet formed at the free end of the magnet along the longitudinal axis. A main magnet coil mounted to the housing has an inner bore which extends around the free end of the permanent magnet such that current supplied to the main coil attracts or repels the magnet to drive the moving bearing and the moving mirror in translation back and forth along the longitudinal axis. Side coils are mounted adjacent to the main coil perpendicular to each other to provide magnetic fields in orthogonal directions to the pole at the free end of the permanent magnet, to selectively apply torque to the support member about its pivot point and pivot the face of the moving mirror. The longitudinal position and the deflection of the face of the moving mirror from a perpendicular can be detected and controlled by control of current supplied to the coils.

31 Claims, 3 Drawing Sheets

INTERFEROMETER OF AN INFRARED SPECTROMETER WITH DYNAMIC MOVING MIRROR ALIGNMENT

FIELD OF THE INVENTION

This invention relates generally to the field of optical systems and particularly to the optics used in the interferometers of Fourier transform infrared spectrometers.

BACKGROUND OF THE INVENTION

Fourier transform infrared (FTIR) spectrometers are utilized in the analysis of chemical compounds. In these instruments, a beam of infrared radiation having a band of infrared wavelengths is passed into an interferometer, typically a Michelson interferometer, and is modulated before being passed through the compound to be analyzed and then to a detector. The interferometer modulates the radiation received by it to provide an output beam in which many narrow ranges of infrared wavelengths are typically reduced or enhanced in intensity, with the affected range of wavelengths changing periodically over time. The time correlated output signal from the detector is analyzed by Fourier transformation to derive information on the characteristics of the sample through which the beam was passed.

In the typical Michelson interferometer used in such FTIR spectrometers, the input beam is received by a beamsplitter which partially passes the beam through to a moving mirror and partially reflects the beam to a fixed mirror, or vice versa, and the reflected beams are recombined at the beamsplitter to yield the output beam. The relative position of the moving mirror with respect to the beamsplitter and fixed mirror will determine which wavelengths constructively and destructively interfere when the beams from the two mirrors are recombined at the beamsplitter. The movement of the moving mirror toward and away from the beamsplitter results in the scanning of the constructively and destructively interfering wavelengths across a desired band of infrared wavelengths. Examples of such Michelson interferometer systems in FTIR instruments are shown in U.S. Pat. Nos. 4,799,001 and 4,847,878 and published Patent Cooperation Treaty application WO 93/14373.

It is critical in the design of FTIR instruments that the surfaces of the fixed mirror and the moving mirror be accurately held orthogonal to each other. Mirror position accuracy is crucial because deviations in the mirror alignment produce small errors in the time domain interferogram which may translate into large errors in the frequency domain spectrum. In a typical interferometer, mirror deviations larger than 1/10 wavelength of the received radiation beam are considered significant and can seriously degrade the quality of the instrument.

Static alignment of the mirrors of the interferometer is typically accomplished by means of precision fine pitch or differential screws at the back of the mirror which are manually adjusted to align the mirror to a desired position as perfectly as possible. This is a time consuming procedure requiring skill and experience, and adds to manufacturing expense and to field service costs because realignment in the field is often required.

Efforts have been made to eliminate the need to manually align the interferometer mirrors. Automatic static alignment at least relieves the user from performing time consuming realignments. For example, stepper motors have been used to carry out automatically the manual alignment procedure described above. Such devices typically use a digital computer which aids in the alignment of the static mirror at periodic service intervals. Disadvantages of this approach are the slow speed, large size, and high cost of, and the high precision bearings required for, the alignment mechanism.

Minor misalignments of the two mirrors can occur during operation due to tilting of the moving mirror as a result of bearing imperfections or vibrations transmitted to the mirror mechanically or acoustically from nearby machinery, fans and other active equipment. To attempt to adjust the moving or fixed mirror dynamically to compensate for the tilting of the moving mirror as it moves on its bearing requires more speed that can be readily obtained with a mechanism using lead screws and stepper motors. Another approach has been to use piezoelectric positioners to align dynamically the tilt of the mirrors. Such positioners are also typically large and expensive, and require high voltage (e.g., 1000 volts) drive levels. The power supplies required for such high voltages also create undesirable operating hazards as well as being relatively expensive. Approaches to dynamic mirror alignment using magnetic coils are shown in U.S. Pat. Nos. 5,239,361 and 5,276,545, although the size and weight of the components best adapts such systems to alignment of the fixed mirror rather than the moving mirror. While dynamic alignment of the fixed mirror can serve to optimize the spectral resolution of an FTIR spectrometer, in some cases dynamic alignment of the fixed mirror may move the output beam relative to the detector enough to reduce system stability. Thus, it would generally be advantageous to dynamically maintain proper alignment of the moving mirror despite the effects of bearing dynamics and vibrations. Alignment of the moving mirror using coils is shown in U.S. Pat. 4,480,914 but implemented using a complex structure that allows only a very limited range of axial movement of the moving mirror.

SUMMARY OF THE INVENTION

In accordance with the present invention, an interferometer for an infrared spectrometer provides dynamic alignment of the moving mirror to maintain precise alignment between the moving mirror and the fixed mirror. The alignment of the moving mirror in this manner maximizes the stability of the interferometer while achieving high levels of output accuracy despite vibrations due to the movement of the moving mirror on its bearings and vibrations transmitted from external sources to the interferometer. The dynamics of the mounting of the moving mirror allow the position of the mirror to be controlled with high accuracy even in the presence of relatively high frequency vibrations. The structure of the interferometer and of the detectors and controls for maintaining the alignment of the moving mirror are nonetheless simple in construction and contribute relatively little additional bulk or weight to the interferometer.

The interferometer may have a conventional Michelson interferometer structure, including a housing with beam entrance and exit openings, a fixed mirror facing one of the exit or entrance openings, and a moving mirror on a moving bearing which is mounted to a stationary bearing on the housing. The moving mirror is mounted to a mirror support member so that the face of the mirror is substantially perpendicular to the longitudinal axis of motion of the bearing as well as perpendicular to the face of the fixed mirror. The mirror support member is mounted to the moving bearing so that the support member can pivot at a pivot point around two orthogonal axes. A permanent magnet is mounted to the mirror support member, preferably with the two magnetic poles aligned so that they lie along the longitudinal axis. The permanent magnet is spaced away from the pivot point so that the magnet and the mirror support member form a lever arm. When magnetic forces are applied to the permanent magnet, these forces act through this lever arm to apply a torque to the mirror support member about the pivot point. Electrical coils are mounted to the housing to selectively apply magnetic fields to the permanent magnet to provide magnetically induced forces on the permanent magnet along three orthogonal axes: the longitudinal axis of translation and two axes which are perpendicular to the longitudinal axis. These coils can be formed as a main solenoid having an internal bore into which the permanent magnet fits, and side coils, also formed of solenoids, which provide magnetic fields through the central bore of the main magnet which have field lines that are perpendicular to the field within the bore of the main coil resulting from currents flowing in the main coil. By selectively applying current to the main coil, the permanent magnet can be either attracted or repelled by forces acting along the direction of the longitudinal axis (with the direction of the force depending on the direction of current applied to the main coil). Current applied selectively to the two side coils attracts or repulses a pole of the permanent magnet in directions which are perpendicular to the longitudinal axis, thus applying a torque to the moving magnet support member about the pivot point. The direction of the torque applied about the pivot point and the amount of torque applied is controllable by controlling the current supplied to the side coils. Thus, these sets of coils together provide a means for applying magnetic fields to the permanent magnet that selectively apply forces acting along the longitudinal axis and torques about two orthogonal axes passing through the pivot point.

The mirror support member is preferably mounted to the moving bearing so that the mirror support member is resiliently returned to a null or rest position. The means for mounting the support member to the moving bearing may include a thin flexible diaphragm, secured at its periphery to the moving bearing (which may be a hollow cylinder), and having a central opening through which the mirror support member passes. A flexible grommet may be engaged between the diaphragm and the mirror support member to help dampen high frequency mechanical vibrations of the diaphragm that would otherwise be transmitted to the mirror support member and thence to the moving mirror itself.

The longitudinal position of the moving mirror and the deflection of the moving mirror from a position perpendicular to the longitudinal axis may be detected utilizing a monochromatic laser beam passed through the interferometer optics, which typically includes a beamsplitter mounted diagonally between the fixed mirror and the moving mirror. The laser beam is partially reflected and partially passed through the beamsplitter, and the split beams are reflected from the fixed mirror and moving mirror back to the beamsplitter and recombined at the beamsplitter to provide an output beam which can be detected to count interference fringes and thereby determine the position or speed of the moving mirror along the longitudinal translation axis. In addition, the detector may comprise multiple separated detectors (e.g., three) which thereby allow detection of components of the recombined beams that originate at three different spaced positions on the moving mirror. Deviations in the phases of the detected signals from the multiple detectors indicates a misalignment of the moving mirror with respect to a perpendicular to the longitudinal axis. These detected deviations can then be used by a controller to apply currents to the orthogonal side coils to apply appropriate torque to the mirror support and realign the face of the moving mirror. This realignment is preferably carried out with a closed loop control system to continuously maintain the moving mirror in proper alignment.

Because the combined suspended mass of the moving mirror, its support member, and the permanent magnet mounted to the support member, is relatively small, the frequency response of this structure has a relatively high cutoff frequency, allowing the moving mirror to be realigned to compensate for even relatively high frequency vibrations. The suspended mass connected to the moving mirror is significantly less than required in systems wherein the electrical coils are mounted to the moving mirror itself. Further, because the electrical coils are mounted to the housing and are fixed in position, no electrical wires need be connected to the moving mirror structure.

Further objects, features and advantages of the invention will be apparent from the following detailed description when taken in conjunction with the accompanying drawings.

DETAILED DESCRIPTION OF THE INVENTION

Figure 1:
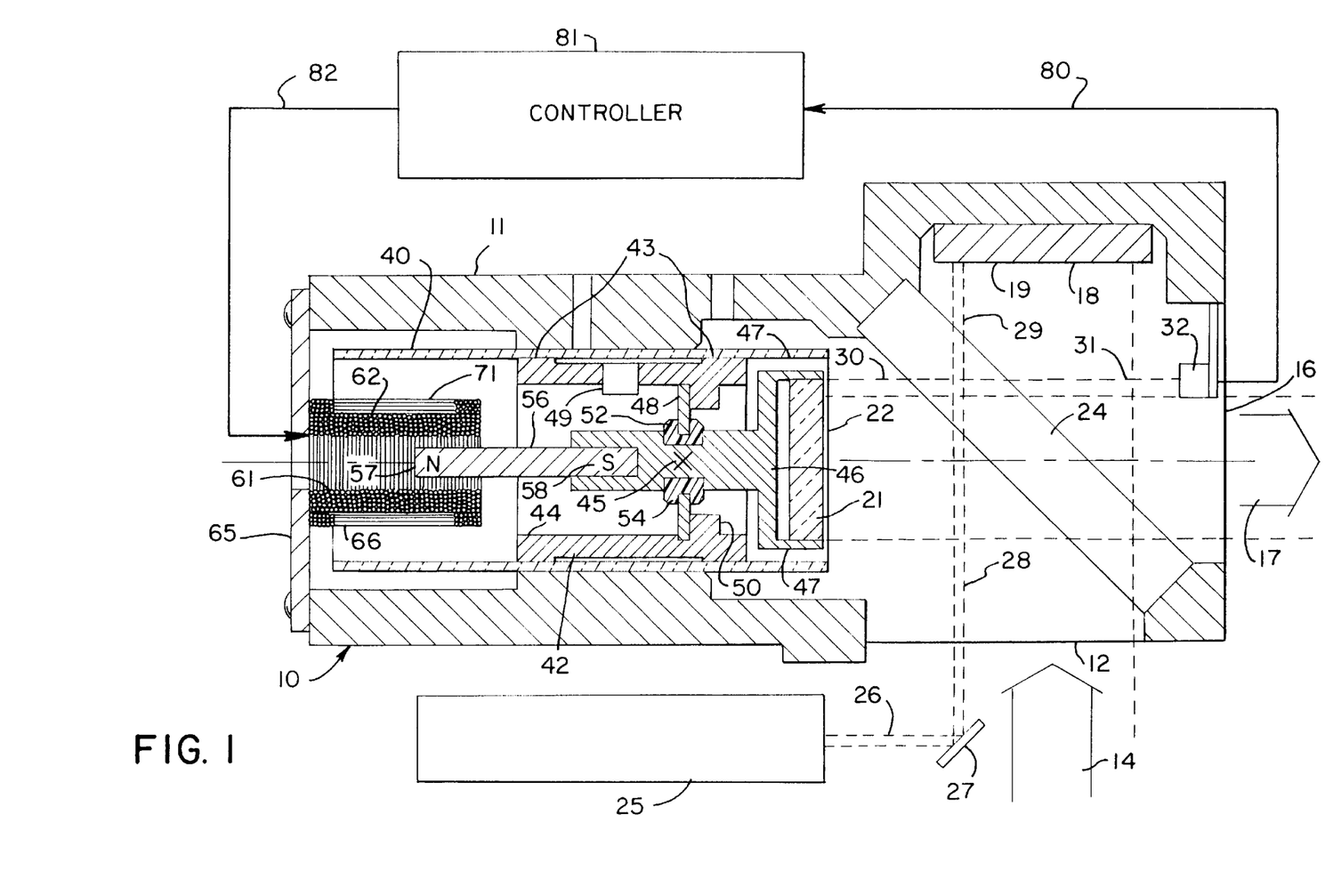
FIG. 1 is a cross-sectional view through an interferometer having a dynamically alignable moving mirror in accordance with the present invention.

With reference to the drawings, an interferometer for an infrared spectrometer in accordance with the invention is shown generally at 10 in cross-section in FIG. 1. The interferometer 10 includes a housing 11 which may be of substantially conventional construction, for example, formed of a metal such as cast aluminum. The interferometer housing 11 has an entrance opening 12 into which a beam 14 of infrared light enters, and an exit opening 16 through which a beam of infrared light 17 exits. The interferometer 10 is constructed as a Michelson interferometer having a fixed mirror 18 with a mirror surface 19 facing the incoming beam 14, a moving mirror 21 with a mirror surface 22 facing the exit opening 16, and a beamsplitter 24 of conventional construction. As described further below, the moving mirror 21 is mounted for back and forth movement along a longitudinal axis toward and away from the exit opening 16. As the moving mirror 21 traverses its range of motion, the infrared beam 17 exiting the interferometer is modulated to cyclically produce peaks and valleys in the various wavelengths within the band of wavelengths contained in the infrared input beam 14, which may be provided from a broadband infrared source (not shown). In a conventional manner, the output beam 17 is directed to a sample chamber and thence to focusing mirrors which focus the infrared beam on a detector, thereby allowing analysis of the chemical characteristics of the sample in the sample chamber. If desired, the positions of the fixed mirror and the moving mirror with respect to the entrance and exit openings may be interchanged.

The position of the moving mirror 21 may be detected in a conventional manner using a laser 25 which provides an output beam 26 that is reflected by a mirror 27 to provide a beam 28 that partially passes through the beamsplitter 24 and is reflected in a beam 29 from the face 19 of the stationary mirror 18. A portion of the beam 28 is reflected by the beamsplitter 24 and directed to the moving mirror face 22, where it is reflected in a beam 30 back to the beamsplitter. The recombination of the portion of the beam 30 that passes through the beamsplitter with the portion of the beam 29 reflected by the beamsplitter provides an output beam 31 which contains interference fringes that correspond to one wavelength of the monochromatic light in the output beam 26 from the laser 25, thereby allowing the speed and position of the face 22 of the moving mirror 21 to be precisely determined by counting the peaks and valleys in the amplitude of the beam 31 as detected by a detector unit 32. Such position detectors for infrared spectrometers are conventional and well known, for example, as described in U.S. Pat. No. 4,847,878, the disclosure of which is incorporated by reference.

As explained further below, the output beam of the laser 25 may be utilized to determine both the longitudinal position of the moving mirror 21 and the alignment of the mirror with respect to the longitudinal axis of motion. As used herein, the longitudinal direction of the moving mirror 21 is along a central axis 36 which extends longitudinally parallel to the output beam 17. It is desired that the axis of motion of the moving mirror 21 be precisely perpendicular to the incoming beam 14 and, moreover, that the planar face surface 22 of the moving mirror 21 be precisely perpendicular to the axis 36 and, correspondingly, precisely perpendicular to the planar face surface 19 of the stationary mirror 18. It is also preferable that the stationary mirror 18 have its face surface 19 maintained perpendicular to the incoming beam 14 so that the input beam is maximally reflected by the face surface 19 of the stationary mirror to maintain the maximum sensitivity of the spectrometer. In the present invention, the potential deviations of the face surface 22 of the moving mirror from a true perpendicular to the face surface 19 of the stationary mirror 18 are corrected by adjusting the position of the moving mirror 22 rather than the position of the stationary mirror 18.

In the present invention, it is preferred that the moving mirror 21 be mounted within the housing 11 for back and forth translation along the longitudinal axis 36 without displacement from the axis. In accordance with a preferred embodiment, the moving mirror 21 may be mounted for reciprocating sliding movement utilizing a glass-graphite bearing system as described in published Patent Cooperation Treaty application WO 93/14373 entitled "Bearing for a Moving Mirror of a Michelson Interferometer". In such a structure, the means for mounting the moving mirror for reciprocating motion within the housing 11 comprises an outer stationary bearing cylinder 40, e.g., formed of glass, and a movable mounting assembly for the mirror 21 which includes a cylindrical moving bearing 42, e.g., formed of graphite, which has an outer cylindrical surface 43 that closely conforms to the inner cylindrical surface of the stationary bearing cylinder 40. The bearing 42 may be hollow and have an inner cylindrical surface 44. However, it is understood that these structures could be interchanged, and that the moving bearing cylinder 42 may be formed of glass and the outer stationary bearing cylinder 40 may be formed of graphite. The glass-graphite bearing structure has the advantages of low friction and smooth starting and stopping action, as described in the foregoing published International Application WO 93/14373. However, it is further understood that any other mounting system may be utilized that provides mounting for translation of the moving mirror 21 back and forth along the longitudinal axis 36. It is preferred that the engagement of the moving bearing to the stationary bearing be such that the moving bearing is restrained to one degree of freedom—translation along the longitudinal axis—and cannot otherwise rotate (i.e., cannot roll, pitch or yaw) or translate in directions perpendicular to the longitudinal axis 36.

In the present invention, the moving mirror 21 is mounted to the moving bearing 42, which provides a base structure for the moving mirror, to permit pivoting of the face surface 22 around two orthogonal axes which are themselves orthogonal to the longitudinal axis 36. The two axes of rotation intersect at a central pivot point 45 within the center of a mirror support member 46 to which the moving mirror 21 is rigidly mounted. For example, the support member 46 may have projections 47 which closely receive the mirror 21 then being secured to it by, e.g., permanent adhesives. With reference to the view of FIG. 1, the two orthogonal axes about which the mirror 22 is mounted for pivoting motion would extend vertically and horizontally through the pivot point 45. If desired, a small permanent magnet 49 may be mounted in the wall of the moving bearing to magnetically interact with a ferromagnetic piece or another permanent magnet (not shown) in the housing to restrain rotation of the bearing 42.

In an exemplary mounting of the support member 46 to the moving bearing 42 for pivoting, a flexure diaphragm 48 is secured to an inwardly projecting flange 50 of the moving bearing 42. The diaphragm 48 may be formed of thin sheet metal having a central opening 52, with the support member 46 being engaged to the diaphragm 48 within the central opening 52. The diaphragm resiliently flexes to allow pivoting of the support member 46 about the pivot point 45 and resiliently returns the mounting member to a null position. Preferably, a vibration dampening flexible grommet 54 is engaged between the inner opening 52 of the disk 48 and the support member 46. The grommet 54 is preferably formed of a rubber or rubber-like material that absorbs high frequency vibrations but permits lower frequency deflections of the mounting member 46 about the pivot point 45 that are generated in a desired manner, as described further below.

In the present invention, structure of the drive mechanism for driving the mirror 21, and thus the bearing 42 and the structures 46, 48 and 52 connecting the bearing 42 to the mirror 21, in translational motion along the longitudinal axis 36, may also be utilized to provide controlled pivoting of the face 22 of the mirror 21 about the pivot point 45. A preferred means for driving the moving mirror 21 along the translational longitudinal axis 36 and about the two pivoting axes which intersect at the pivot point 45, includes a permanent magnet 56, having a north pole 57 at the free end of the magnet and a south pole 58, which is firmly connected to the support member 46 at a position with respect to the pivot point 45 that is opposite to that at which the mirror 21 is mounted to the member 46. As shown in FIG. 1, the permanent magnet 56 is preferably substantially cylindrical and elongated, and is aligned with its central axis coinciding with the longitudinal axis 36, i.e., with the north pole 57 and the south pole 58 aligned generally along the longitudinal axis. The means for driving the mirror in translation further comprises a main solenoidal coil 60 which has a central bore 61 wide enough to admit the permanent magnet 56 and an outer surface 62 which may have a smaller diameter than the inner diameter of the stationary bearing 42 so that the coil 60 can fit within the bearing, at least in part. If desired, the diameter of the coil 60 may also be less than the diameter of the inner cylindrical surface 44 of the moving bearing. The solenoidal coil 60 is firmly mounted to the housing 11, such as by being connected at one end to a flange 65 which is itself engaged to the housing 11. When current is passed through the wires of the solenoidal coil 60 in one direction supplied from a source, (not shown) to the coil leads 60A and 60B, the interaction of the field produced by the main coil 60 within the bore 61 with the magnetic field of the permanent magnet 56 attracts the magnet 56 and the rest of the movable mirror assembly (comprising the mirror 21, support member 46, bearing 42, diaphragm 48 and grommet 52) toward the coil 60, with the magnet 56 extending partially into the bore of the coil 60. When current is passed through the coil 60 in the opposite direction, the magnetic field produced by the coil 60 interacts with the magnetic field of the permanent magnet 56 to repel the magnet to drive the mirror assembly in the opposite direction along the axis 36. In this manner, by alternately providing current in one direction and then the other through the coil 60, the moving mirror assembly 55 can be moved back and forth along the longitudinal axis 36 in reciprocating motion at a rate that can be controlled by control of the current supplied to the magnet 60.

Figure 2:
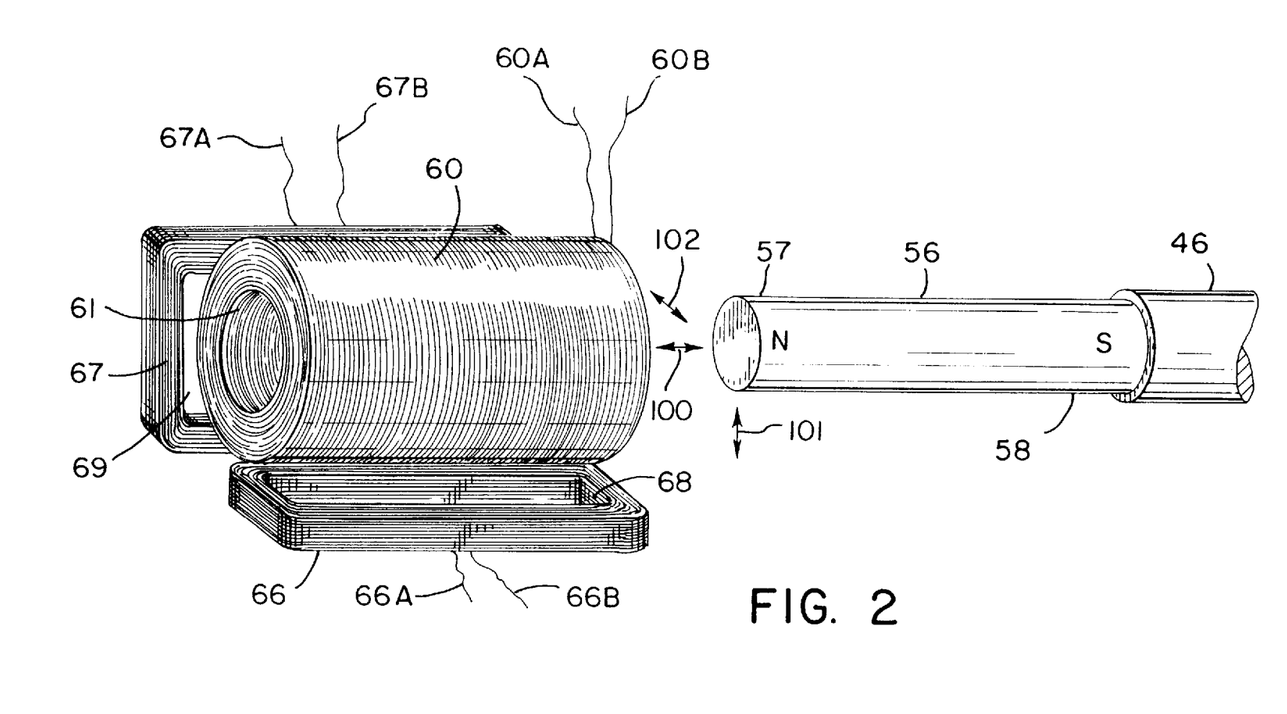
FIG. 2 is an illustrative view showing the general relationship between the permanent magnet on the moving mirror assembly and the main coil and side coils.

In addition to the solenoidal magnet coil 60, which produces a magnetic field through the center bore 61 of the magnet 60 having lines of force which are generally parallel to the longitudinal axis 36 (with the direction of the field depending on the direction of current supplied to the coil 60), additional orthogonal side coils 66 and 67 (best shown in FIG. 2) are mounted adjacent to the coil 60, connected to and fixed with respect to the housing 11, such as by being secured to the outer surface of the coil 60 and/or to the flange 65. The side coils 66 and 67 are also preferably solenoidal wound coils having a low aspect ratio (thickness to lateral dimensions of the coils), and the coils 66 and 67 have broad, substantially rectangular central bores 68 and 69, respectively. The coil 66 is oriented so that the magnetic field from current flowing in the turns of the coil provided to the coil leads 60A and 66B will provide a magnetic field having lines of force that are generally vertical in the orientation of the coil shown in FIG. 2, and thus orthogonal to the lines of force of the magnetic field within the bore 61 from the coil 60. The coil 67 is oriented substantially vertically, as shown in FIG. 2, so that the lines of force of the magnetic field resulting from a current flowing in the turns of the coil 67 provided to coil leads 67A and 67B will be substantially horizontal, in the orientation of the coil as shown in FIG. 2, and thus generally orthogonal to the field from the coil 60 within the bore 61 and also generally orthogonal to the field resulting from current flowing in the coil 66. As illustrated in FIG. 2, the field from the coil 60 exerts forces on the free end 57 of the magnet oriented along directions 100 lying along the longitudinal axis, whereas the coils 66 and 67 exert force on the free end 57 along orthogonal directions 101 and 102 as shown in FIG. 2.

Figures 3, 4:
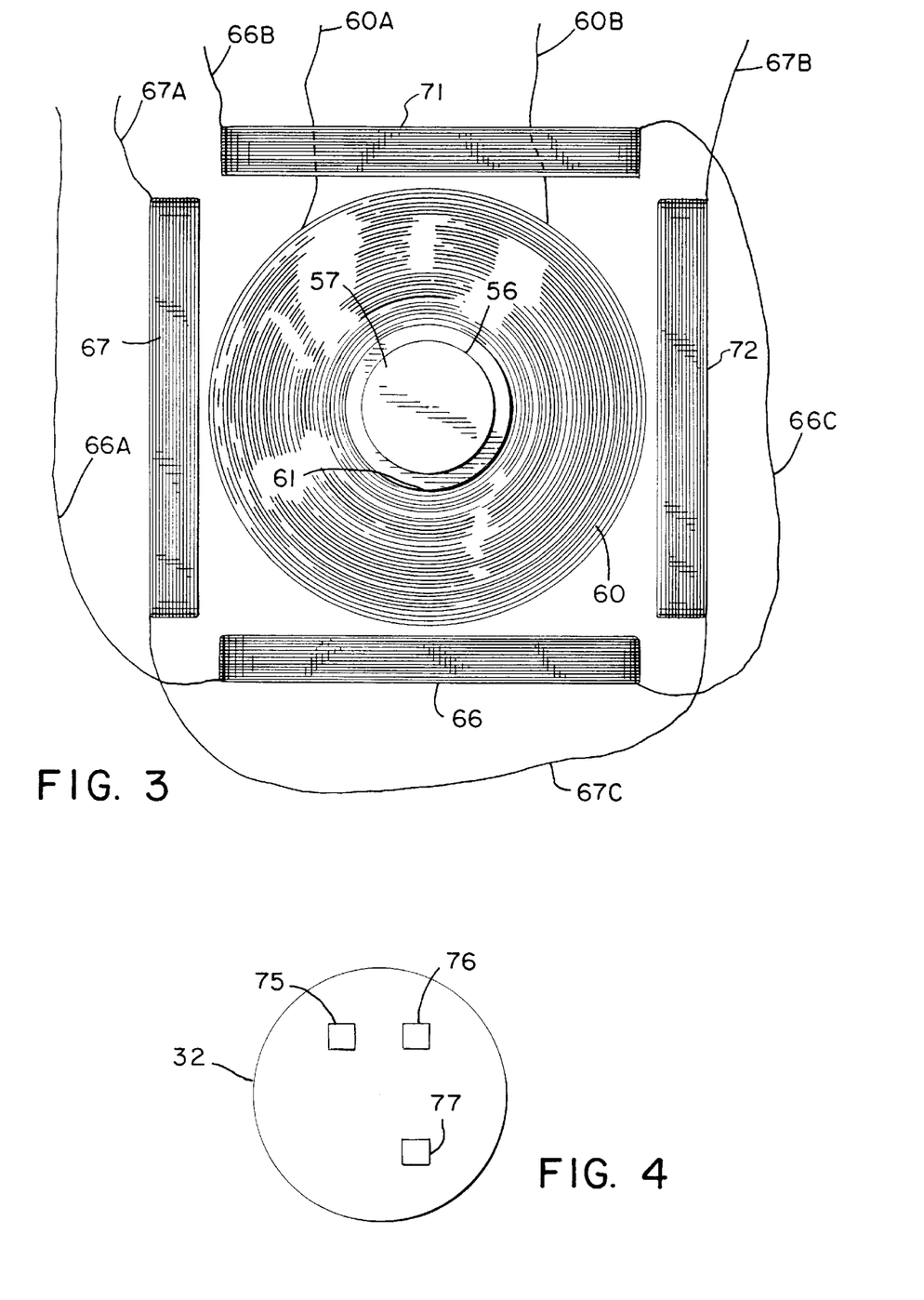
FIG. 3 is an illustrative end view of the main coil and side coils and their relationship to the permanent magnet of the moving mirror structure.
FIG. 4 is an illustrative elevational view of the detector for the monochromatic laser beam by which the longitudinal position and alignment of the face of the moving mirror may be detected.

As shown in FIG. 3, it is further preferred that the horizontally oriented coil 66 be paired with another horizontally oriented coil 71 located on the opposite side of the coil 60, and that the coil 67 be paired with another coil 72 located on the opposite side of the coil 60 from the coil 67. The coils 66 and 71 are connected to carry current together by a lead 66C so that their magnetic fields add, i.e., when current is supplied from the leads 66A and 66B to the coils in one direction of current flow, the magnetic lines of force extend upwardly through the bore 61 of the coil 60, and when current flows through the coils 66 and 71 in the opposite direction, the magnetic field lines extend downwardly through the bore 61 of the coil 60. In the same way, the coil 67 and 72 are connected to conduct current together by a lead 67C so that the fields of the two coils add; thus, when current is provided to the leads 67A and 67B and flows in one direction through the coils 67 and 72, the magnetic field lines extend from left to right in the view of FIG. 3 in a horizontal direction through the bore 61, and when the current is supplied in the opposite direction through the coils, the magnetic field lines extend from right to left horizontally through the bore 61.

It will thus be appreciated that when the north pole end 57 of the permanent magnet 56 is adjacent to or within the bore 61 of the coil 60, current supplied to the coil 60 in one direction will attract the magnet 56 in the longitudinal direction (to produce translation along the axis 36), and current supplied in the opposite direction through the coil 60 will repel the magnet 56 in the longitudinal direction. Similarly, current supplied through the coil 66 (and the coil 71) in one direction will draw the north pole end 57 of the magnet 56 upwardly, whereas current supplied to the coils 66 and 71 in the opposite direction will draw the north pole end 57 of the magnet 56 downwardly. The force applied to the north pole end 57 of the magnet creates a torque applied through a lever arm—provided by the magnet 56 and the extending portion of the support member 46 to which it is connected—about the pivot point 45 to pivot the mirror 21 so that its face 22 pivots upwardly or downwardly about a horizontal axis which intersects the pivot point 45. similarly, current supplied to the coil 67 (and the coil 72) in one direction will draw the north pole end 57 of the magnet 56 to the left as shown in FIG. 3, whereas current supplied in the opposite direction will draw the north pole end 57 to the right as shown in FIG. 3. Again, the effect is to apply a torque about the pivot point 45 to pivot the mirror 21 so that its face 22 turns to the left or right about a vertical axis passing through the pivot point 45. In this way, the magnetic forces applied by the coils 60 and 66, 67 (and 71, 72) can provide translation of the face 22 of the mirror 21 back and forth along the longitudinal axis 36 and pivoting about the pivot point 45 about both a horizontal axis and a vertical axis, with all of the axes intersecting at the pivot point 45. Further, the amount of torque applied about the pivot point 45 can be controlled by controlling the current supplied to the coils 66, 67 (and the coils 71, 72). Since all of the coils are mounted to the housing of the interferometer rather than to the moving mirror assembly, no electrical connections need be made to the moving mirror assembly, and the weight of the assembly can be minimized. The diaphragm 48 and the grommet 52 (where used) provide a means for resiliently returning the moving mirror support member 46, and the mirror 21 attached to it, to a rest or null position when no magnetic torques are applied about the pivot point 45. Other means for doing so, such as springs, as well as any other desired pivot mechanisms, may also be used. If desired, the mirror support member may be freely pivotally mounted to the bearing and the coils 66, 67, 71 and 72 used to maintain alignments without a means for returning the mirror to a null position.

As illustrated in FIG. 4, the detector unit 32 preferably comprises three spaced photodetectors 75, 76 and 77. The plane in which the surfaces of the detectors 75–77 lie is normal to the longitudinal axis 36 and, if the orientation of the face 19 of the fixed mirror 18 to the face 22 of the moving mirror 21 is truly perpendicular and correct, the phase of the modulation of the laser light in the beam 31 received by each of the three detectors 75–77 will be the same. However, if the orientation of the mirror face 22 is not correct, the phases of the signals from these detectors will differ. The output of the three detectors 75–77 is provided on output lines 80 to a controller 81, which may be a dedicated digital computer or digital signal processor. The controller 81 provides output drive current signals on lines 82 to the coil 60 and the side coils 66 and 67 (and the coils 71 and 72 where present) to move the moving mirror 21 along the longitudinal axis at a desired speed and to a desired limit of movement in each direction of translation, and to apply torque to the mirror support member 46 about the pivot point 45 to maintain the orientation of the face of the moving mirror 22 correctly so that the phases of the laser beam as detected by the detectors 75–77 are the same. Because the combined weight of the moving mirror 21, the mirror support member 46 and the permanent magnet 56 is relatively small, the cutoff frequency of the frequency response of these elements about the pivot point 45 is quite high, allowing rapid pivoting of the face 22 of the moving mirror 21 as the mirror is translated. In this manner, a high gain, high accuracy feedback control loop may be implemented so that the current provided on the output lines 82 to the coils will maintain the moving mirror face 22 properly aligned on a continuous dynamic basis. Of course, appropriate electronic damping and compensation may be provided in the control loop to provide a desired frequency response for the control loop to maintain the stability of the loop and the desired accuracy of the response.

It is a particular advantage of the present invention that it is the movable mirror 21 whose orientation is maintained properly rather than the fixed mirror 18. This advantage is obtained because any error in the orientation of the moving mirror 21, if compensated for by an adjustment of the orientation of the fixed mirror 18 on a dynamic basis, can result in a small but nonetheless undesirable change in the direction of the beam 17 exiting the interferometer, which can affect the interferograms obtained utilizing that beam. In the present invention, the fixed mirror 18 can be mounted to the solid housing 11 in a precisely determined and firmly fixed position, and the position of the moving mirror 21, which is thus the only mirror that can deviate from its desired position, can be adjusted dynamically to always maintain the proper desired alignment. Of course, the mirror alignment device formed by the structure supported by the moving bearing in cooperation with the orthogonal coils 66, 67 may be used to align the fixed mirror, if desired, as well as for aligning mirrors in other applications.

It is understood that the invention is not confined to the particular construction and arrangement of parts herein illustrated and described, but embraces such modified forms thereof as come within the scope of the following claims.

What is claimed is:

1. An interferometer that may be used in an infrared spectrometer comprising:
   (a) an interferometer housing having a beam entrance opening and a beam exit opening;
   (b) a stationary bearing mounted to the housing;
   (c) a moving bearing mounted to the stationary bearing for translation of the moving bearing along a longitudinal axis;
   (d) a mirror support member;
   (e) means for mounting the mirror support member to the moving bearing for pivoting of the support member about a pivot point;
   (f) a moving mirror having a mirror face, the moving mirror mounted to the mirror support member with the mirror face substantially perpendicular to the longitudinal translation axis of the moving bearing;
   (g) a permanent magnet having north and south poles mounted to the mirror support member on a side of the pivot point opposite to that at which the moving mirror is mounted to the support member;
   (h) means mounted to the housing for selectively applying magnetic fields to the permanent magnet to selectively attract or repel the magnet, and thus the bearing and the moving mirror supported thereby, along the longitudinal axis, and to selectively attract or repel the permanent magnet along two orthogonal axes which are themselves orthogonal to the longitudinal axis to apply torque to the mirror support member about the pivot point thereby to pivot the face of the moving mirror about the pivot point;
   (i) a fixed mirror with a mirror face, the fixed mirror mounted to the housing with its face parallel to the longitudinal translation axis of the moving bearing and substantially perpendicular to the face of the moving mirror, one of the fixed mirror and the moving mirror facing the entrance opening of the housing and the other of the fixed mirror and moving mirror facing the exit opening of the housing; and
   (j) a beamsplitter mounted to the interferometer housing diagonally between the fixed mirror and the moving mirror.

2. The interferometer of claim 1 wherein the stationary bearing has a cylindrical inner bore surface and the moving bearing has a cylindrical outer surface which closely fits within the stationary bearing inner bore for a sliding motion of the moving bearing with respect to the stationary bearing.

3. The interferometer of claim 2 where one of the stationary bearing and moving bearing is formed of glass and the other is formed of graphite.

4. The interferometer of claim 1 further including means for resiliently returning the support member to a null position.

5. The interferometer of claim 4 wherein the moving bearing has a cylindrical inner surface and the means for mounting the mirror support member to the moving bearing and the means for resiliently returning the support member to a null position comprises a thin flexure diaphragm secured at its periphery to the moving bearing with an opening in the diaphragm through which the mirror support member passes, the support member mounted to the diaphragm.

6. The interferometer of claim 5 including a flexible grommet engaged between the diaphragm and the mirror support member to dampen high frequency vibrations of the diaphragm and the mirror support member.

7. The interferometer of claim 1 wherein the means for selectively applying magnetic fields includes a main solenoid coil having an inner bore aligned with the longitudinal translation axis of the moving bearing, and orthogonal side coils mounted adjacent to the main coil, the side coils oriented to provide magnetic fields which pass through the central bore of the main coil with magnetic lines of force that are perpendicular to each other and to the magnetic lines of force from current flowing in the main coil.

8. The interferometer of claim 7 wherein there are two pairs of orthogonal side coils, each pair mounted on opposite sides of the main coil.

9. The interferometer of claim 7 wherein the permanent magnet is formed as an elongated cylinder with its north pole at one end and its south pole at its other end, the permanent magnet mounted to the mirror support member so that the north and south poles of the magnet lie along the longitudinal axis, the outside diameter of the cylindrical permanent magnet being less than the diameter of the inner bore of the main coil and the permanent magnet extending into the bore of the main coil so that one of the poles of the permanent magnet is within the bore of the main coil.

10. The interferometer of claim 9 wherein the stationary bearing has a cylindrical inner bore, and wherein the main coil has an outer diameter less than the diameter of the inner bore of the stationary bearing and with the main coil mounted at least partially within the bore of the stationary bearing.

11. The interferometer of claim 1 further comprising means for detecting the longitudinal displacement of the face of the moving mirror and the pivoting of the face of the moving mirror about orthogonal axes which are orthogonal to the longitudinal axis of motion of the moving mirror.

12. The interferometer of claim 11 wherein the means for detecting the position of the moving mirror comprises a laser providing an output beam that is directed into the entrance opening of the interferometer to the beamsplitter wherein the laser beam is partially reflected and partially transmitted, and wherein the portions of the laser beam reflected back from the fixed mirror and moving mirror are recombined at the beamsplitter to an output beam which passes toward the exit opening, and a detector unit mounted to receive the output beam, the detector unit including multiple photodetectors spaced from each other so as to detect interference fringes of the monochromatic recombined beam at each photodetector position whereby the longitudinal position of the moving mirror can be determined by counting the interference fringes detected by the photodetectors and wherein the deviation of the face of the moving mirror from a perpendicular to the longitudinal axis can be determined from differences in the phases of the interference fringes as detected by the multiple photodetectors.

13. The interferometer of claim 12 further comprising control means receiving the output signals from the photodetectors and utilizing the positional information from the photodetectors to provide an output signal to the means for selectively applying magnetic fields to the permanent magnet to adjust the magnetic fields applied to the permanent magnet to control the longitudinal motion of the moving bearing and the moving mirror and the pivoting of the mirror support and the moving mirror attached to it about the pivot point to dynamically maintain the face of the moving mirror perpendicular to the longitudinal axis of translation and perpendicular to the face of the fixed mirror.

14. A mirror alignment device for dynamically aligning a mirror of an interferometer for a spectrometer comprising:
    (a) a base structure;
    (b) a mirror support member and a mirror mounted to the mirror support member, the mirror having a face substantially perpendicular to a longitudinal axis which passes through the mirror support member;
    (c) means for mounting the mirror support member to the base structure for pivoting of the mirror support member about a pivot point;
    (d) a permanent magnet having a north pole and a south pole spaced from each other mounted to the mounting member, with the north pole and south pole of the permanent magnet lying along the longitudinal axis which passes through the pivot point, the permanent magnet mounted to the mirror support member on a side of the mirror support member opposite to that to which the mirror is mounted to the mirror support member, one of the poles of the magnet located at a free end of the magnet spaced from the mirror support member; and
    (e) two side coils positioned adjacent to the pole of the permanent magnet at the free end of the permanent magnet, the two side coils wound as solenoid coils positioned perpendicular to each other, the magnetic field from current flowing in one of the coils having field lines directed at the position of the free end pole of the permanent magnet which are oriented generally perpendicular to the longitudinal axis in a first direction, and the field lines from current flowing in the second coil directed toward the free end pole of the permanent magnet oriented generally perpendicular to the longitudinal axis and also perpendicular to the field from the first coil, whereby current applied to the first coil selectively attracts or repels the free end of the permanent magnet in one direction or another to pivot the mirror support about its pivot point around a first axis orthogonal to the longitudinal axis, and whereby current applied to the other coil attracts or repels the free end of the electromagnet to pivot the support member about a second axis which is orthogonal to both the first axis and the longitudinal axis.

15. The mirror alignment device of claim 14 further including means for resiliently returning the mirror support member to a null position.

16. The mirror alignment device of claim 15 wherein the base structure has a substantially cylindrical inner surface, and wherein the means for mounting the mirror support member to the base structure and for resiliently returning the mirror support member comprises a flexure diaphragm secured at its periphery to the inner surface of the support structure, an opening formed in the diaphragm through which the support member passes, with the support member mounted to the diaphragm.

17. The mirror alignment device of claim 16 further including a flexible grommet engaged between the flexible diaphragm and the mirror support member.

18. The mirror alignment device of claim 14 further comprising a solenoidal coil having a hollow bore aligned with a longitudinal axis of the support member, the central bore of the solenoid coil larger than the outside dimensions of the permanent magnet and with the free end of the permanent magnet extending into the bore of the solenoidal coil, whereby current selectively applied to the solenoidal coil provides a magnetic field within the bore of the solenoidal coil which acts on the pole of the permanent magnet within the coil to attract or repel it along the longitudinal axis of the mirror support member.

19. An interferometer that may be used in an infrared spectrometer comprising:
    (a) an interferometer housing having a beam entrance opening and a beam exit opening;
    (b) a stationary bearing mounted to the housing, wherein the stationary bearing has a cylindrical inner bore;
    (c) a moving bearing mounted to the stationary bearing for translation of the moving bearing along a longitudinal axis;
    (d) a mirror support member mounted to the moving bearing;
    (e) a moving mirror having a mirror face, the moving mirror mounted to the mirror support member with the mirror face substantially perpendicular to the longitudinal translation axis of the moving bearing;
    (f) a permanent magnet having north and south poles mounted to the mirror support member having one of the poles at a free end of the magnet, the permanent magnet formed as an elongated cylinder with its north pole at one end and its south pole at its other end, and mounted to the mirror support member so that the north and south poles of the magnet lie along the longitudinal axis;

(g) a solenoid coil with an inner bore such that the free end of the magnet can move into the bore of the coil so that one of the poles of the permanent magnet is within the bore of the solenoid coil, such that current supplied to the coil applies magnetic fields to the permanent magnet to selectively attract or repel the magnet and thus the bearing and the moving mirror supported thereby along the longitudinal axis, wherein the solenoid coil has an outer diameter less than the diameter of the inner bore of the stationary bearing and with the solenoid coil mounted at least partially within the bore of the stationary bearing;

(h) a fixed mirror with a mirror face, the fixed mirror mounted to the housing with its face parallel to the longitudinal translation axis of the moving bearing and substantially perpendicular to the face of the moving mirror, one of the fixed mirror and the moving mirror facing the entrance opening of the housing and the other of the fixed mirror and moving mirror facing the exit opening of the housing; and (i) a beamsplitter mounted to the interferometer housing diagonally between the fixed mirror and the moving mirror.

20. The interferometer of claim 19 wherein the stationary bearing has a cylindrical inner bore and the moving bearing has a cylindrical outer surface which closely fits within the stationary bearing inner bore for a sliding motion of the moving bearing with respect to the stationary bearing.

21. The interferometer of claim 20 where one of the stationary bearing and moving bearing is formed of glass and the other is formed of graphite.

22. The interferometer of claim 19 wherein the permanent magnet has an elongated form with its north pole at one end and south pole at its other end, the permanent magnet mounted to the mirror support member so that the north and south poles of the magnet lie along the longitudinal axis, the outside diameter of the permanent magnet being less than the inner bore of the solenoid coil and the free end of the permanent magnet extending into the main coil so that one of the poles of the permanent magnet is within the bore of the main coil.

23. The interferometer of claim 22 wherein the stationary bearing has a cylindrical inner bore, and wherein the solenoid coil has an outer diameter less than the diameter of the inner bore of the stationary bearings and with the main coil mounted at least partially within the bore of the stationary bearing.

24. An interferometer that may be used in an infrared spectrometer comprising:

(a) an interferometer housing having a beam entrance opening and a beam exit opening;

(b) a stationary bearing mounted to the housing, the stationary bearing having a cylindrical inner bore;

(c) a moving bearing mounted to the stationary bearing for translation of the moving bearing along a longitudinal axis, the moving bearing having a cylindrical outer surface which closely fits within the stationary bearing inner bore;

(d) a mirror support member;

(e) means for mounting the mirror support member to the moving bearing for pivoting of the support member about a pivot point and for resiliently returning the support member to a null position;

(f) a moving mirror having a mirror face, the moving mirror mounted to the mirror support member with the mirror face substantially perpendicular to the longitudinal translation axis of the moving bearing;

(g) a permanent magnet having north and south poles mounted to the mirror support member on a side of the pivot point opposite to that at which the moving mirror is mounted to the support member and having a free end at which one of the poles is located;

(h) a main solenoid coil having an inner bore aligned with the longitudinal translation axis of the moving bearing, and orthogonal side coils mounted adjacent to the main coil, the side coils oriented to provide magnetic fields which pass through the central bore of the main coil with magnetic lines of force that are perpendicular to each other and to the magnetic lines of force from current flowing in the main coil, such that current selectively applied to the coils selectively applies magnetic fields to the permanent magnet to selectively attract or repel the magnet, and thus the bearing and the moving mirror supported thereby along the longitudinal axis and to attract or repel the permanent magnet along two orthogonal axes which are themselves orthogonal to the longitudinal axis to apply torque to the mirror support member about the pivot point thereby to pivot the face of the moving mirror about the pivot point;

(i) a fixed mirror with a mirror face, the fixed mirror mounted to the housing with its face parallel to the longitudinal axis of the moving bearing and substantially perpendicular to the face of the moving mirror, one of the fixed mirror and the moving mirror facing the entrance opening of the housing and the other of the fixed mirror and moving mirror facing the exit opening of the housing; and (j) a beamsplitter mounted to the interferometer housing diagonally between the fixed mirror and the moving mirror.

25. The interferometer of claim 24 where one of the stationary bearing and moving bearing is formed of glass and the other is formed of graphite.

26. The interferometer of claim 24 wherein the moving for mounting the mirror support member to the moving bearing comprises a thin diaphragm secured at its periphery to the moving bearing with an opening in the diaphragm through which the mirror support member passes, the support member mounted to the diaphragm.

27. The interferometer of claim 26 including a flexible grommet engaged between the diaphragm and the mirror support member to dampen transmission of high frequency vibrations from the diaphragm to the mirror support member.

28. The interferometer of claim 24 wherein the permanent magnet has an elongated cylinder form with its north pole at one end and its south pole at its other end, the permanent magnet mounted to the mirror support member so that the north and south poles of the magnet lie along the axis, the outside diameter of the permanent magnet being less than the inner bore of the main coil and the free end of the permanent magnet extending into the main coil so that one of the poles of the permanent magnet is within the bore of the main coil.

29. The interferometer of claim 24 further comprising means for detecting the longitudinal displacement of the face of the moving mirror and pivoting of the moving mirror about orthogonal axes which are orthogonal to the longitudinal axis of motion of the moving mirror.

30. The interferometer of claim 29 wherein the means for detecting the position of the moving mirror comprises a laser providing an output beam directed into the entrance opening of the interferometer to the beamsplitter wherein the laser beam is partially reflected and partially transmitted, and wherein the portions of the laser beam reflected back from the fixed mirror and moving mirror are recombined at the beamsplitter to an output beam which passes toward the exit opening, and a detector unit mounted to receive the output beam, the detector unit including multiple photodetectors spaced from each other so as to detect interference fringes of the monochromatic recombined beam at each photodetector position whereby the longitudinal position of the moving mirror can be determined by counting the interference fringes detected by the photodetectors and wherein the deviation of the face of the moving mirror from a perpendicular to the longitudinal axis can be determined from differences in the phases of the interference fringes as detected by the multiple photodetectors.

31. The interferometer of claim 30 further comprising control means receiving the output signals from the photodetectors and utilizing the positional information from the photodetectors to provide an output signal to the means for selectively applying magnetic fields to the permanent magnet to adjust the magnetic fields applied to the permanent magnet to control the longitudinal motion of the moving bearing and the moving mirror and the pivoting of the mirror support and the moving mirror attached to it about the pivot point to dynamically maintain the face of the moving mirror perpendicular to the longitudinal axis of translation and perpendicular to the face of the fixed mirror.

* * * * *